US012603051B2

(12) United States Patent
Qiu et al.

(10) Patent No.: US 12,603,051 B2
(45) Date of Patent: Apr. 14, 2026

(54) DISPLAY PANEL DRIVING METHOD FOR ADJUSTING SUB-PIXEL ROW SCANNING DURATION BASED ON IMAGE DATA, DRIVING CIRCUIT, AND DISPLAY APPARATUS

(71) Applicant: HKC CORPORATION LIMITED, Shenzhen (CN)

(72) Inventors: Bin Qiu, Shenzhen (CN); Junfeng Xie, Shenzhen (CN)

(73) Assignee: HKC CORPORATION LIMITED, Shenzhen (CN)

( * ) Notice: Subject to any disclaimer, the term of this patent is extended or adjusted under 35 U.S.C. 154(b) by 0 days.

(21) Appl. No.: 18/977,226

(22) Filed: Dec. 11, 2024

(65) Prior Publication Data

US 2025/0191537 A1 Jun. 12, 2025

(30) Foreign Application Priority Data

Dec. 12, 2023 (CN) ......................... 202311695778.4

(51) Int. Cl.
*G09G 3/3233* (2016.01)
*G09G 3/20* (2006.01)

(52) U.S. Cl.
CPC ......... *G09G 3/3233* (2013.01); *G09G 3/2074* (2013.01); *G09G 2300/0842* (2013.01); *G09G 2310/08* (2013.01); *G09G 2340/0435* (2013.01)

(58) Field of Classification Search
CPC ............... G09G 3/3233; G09G 3/2074; G09G 2300/0842; G09G 2310/08; G09G 2340/0435
See application file for complete search history.

(56) References Cited

U.S. PATENT DOCUMENTS 6,407,729 B1 * 6/2002 Moon .................. G09G 3/3688 345/99
2010/0001985 A1 1/2010 Chen et al.
2014/0160186 A1 * 6/2014 Oh ....................... G09G 3/3648 345/694

(Continued)

FOREIGN PATENT DOCUMENTS

CN 106847189 A 6/2017
CN 106898325 A 6/2017
CN 110136627 A 8/2019

(Continued)

OTHER PUBLICATIONS

The first office action issued in corresponding CN application No. 202311695778.4 dated Jan. 20, 2024.

*Primary Examiner* — Kwang-Su Yang
(74) *Attorney, Agent, or Firm* — HAUPTMAN HAM, LLP

(57) ABSTRACT

A display panel, a driving circuit, and a display apparatus are provided. The driving method is applicable to a driving circuit. The driving method includes the following. Image data of an image to-be-displayed is acquired. A necessary charging duration of each sub-pixel row according to the image data is determined. The n scan lines are controlled according to a preset sequence to sequentially scan the n sub-pixel rows, to drive the display panel to display the image to-be-displayed, where a scanning duration of each scan line is positively correlated to the necessary charging duration of a sub-pixel row corresponding to the scan line.

17 Claims, 8 Drawing Sheets

(56) References Cited

U.S. PATENT DOCUMENTS

| | | | | |
|---|---|---|---|---|
| 2020/0035168 | A1 | 1/2020 | Ueno et al. | |
| 2024/0046843 | A1* | 2/2024 | Liu | G09G 3/3677 |

FOREIGN PATENT DOCUMENTS

| | | | |
|---|---|---|---|
| CN | 110322827 | A | 10/2019 |
| CN | 110931543 | A | 3/2020 |
| CN | 112700745 | A | 4/2021 |
| CN | 112785979 | A | 5/2021 |
| CN | 113763857 | A | 12/2021 |
| CN | 114863894 | A | 8/2022 |
| CN | 115039168 | A | 9/2022 |
| KR | 20210086018 | A | 7/2021 |

* cited by examiner

DISPLAY PANEL DRIVING METHOD FOR ADJUSTING SUB-PIXEL ROW SCANNING DURATION BASED ON IMAGE DATA, DRIVING CIRCUIT, AND DISPLAY APPARATUS

CROSS-REFERENCE TO RELATED APPLICATIONS

This application claims priority under 35 U.S.C. § 119(a) to Chinese Patent Application No. 202311695778.4, filed Dec. 12, 2023, the entire disclosure of which is incorporated herein by reference.

TECHNICAL FIELD

The present disclosure relates to the field of display technology, in particular, to a driving method for a display panel, a driving circuit, and a display apparatus.

BACKGROUND

Compared with a liquid crystal display (LCD), an organic light-emitting diode (OLED) has advantageous characteristics, such as free of backlight, high contrast, self-illumination, high response speed, wide angle of view, high brightness, bright color, thin design, applicability to flexible panels, broad service temperature range, relatively simple structure, easy manufacturing procedure, and the like. Therefore, the OLED is considered to be a next-generation display technology.

In an OLED display, a sub-pixel is usually of a 2T1C structure. That is, each sub-pixel includes two transistors (T) and one storage capacitor (C). The two transistors include one scan transistor and one drive transistor. The scan transistor is served as a switch for addressing, and the drive transistor provides a driving current for the OLED display. The storage capacitor can store an image data voltage that is input to the sub-pixel during the period of addressing, so that the sub-pixel can continuously emit light in a frame cycle. During operation of the OLED display, a scan line is applied with a strobe pulse (namely, a scanning signal) to turn on the scan transistor, the storage capacitor is charged by a data voltage on a data line, and the voltage of the storage capacitor controls the working state of the drive transistor so as to control the current flowing through the OLED display. In the case where a non-strobe signal is applied to the scan line, the operation of the drive transistor is maintained by the storage capacitor. However, as the resolution and the refresh rate increase, the charging duration of the storage capacitor will be shortened accordingly, and a relatively short charging duration of the storage capacitor may in turn limit the increase of the refresh rate.

SUMMARY

A first aspect of the disclosure provides a driving method for a display panel. The driving method is applicable to a driving circuit, the driving circuit is configured to drive the display panel to display, and the display panel includes n scan lines extending in a row direction and n sub-pixel rows in one-to-one correspondence with the n scan lines, where $1<n$. The driving method includes the following. Image data of an image to be displayed is acquired. A necessary charging duration of each sub-pixel row according to the image data is determined. The n scan lines are controlled according to a preset sequence to sequentially scan the n sub-pixel rows, to drive the display panel to display the image to be displayed, where a scanning duration of each scan line is positively correlated to the necessary charging duration of a sub-pixel row corresponding to the scan line.

A second aspect of the disclosure further provides a driving circuit configured to execute operations in the driving method for the display panel of the first aspect, to drive the display panel to display.

A third aspect of the disclosure further provides a display apparatus. The display apparatus includes the driving circuit of the second aspect and the display panel. The driving circuit is electrically connected to the display panel, and the driving circuit is configured to drive the display panel to display.

Reference signs: 1—display apparatus; 100—display panel; 200—driving circuit; 101—display region; 102—non-display region; 210—scan driving circuit; 220—data driving circuit; 230—timing controller; P—sub-pixel; 111—scan line; 121—data line; T—scan transistor; M—drive transistor; C—storage capacitor; OLED—light-emitting component; VDD—power supply voltage; VSS—reference voltage.

The disclosure will be further described in the following detailed description in accompany with the above drawings.

DETAILED DESCRIPTION

The following will illustrate technical solutions of embodiments of the disclosure with reference to the accompanying drawings of embodiments of the disclosure. Apparently, embodiments described herein are merely some embodiments, rather than all embodiments, of the disclosure. Based on the embodiments of the disclosure, all other embodiments obtained by those of ordinary skill in the art without creative effort shall fall within the protection scope of the disclosure.

The terms "first", "second", and the like in the description, claims of the present disclosure, and the above accompanying drawings are used for distinguishing different objects, rather than for describing a specific order. In addition, the terms "include", "have", and any variations thereof are intended to cover non-exclusive inclusions. For example, a process, method, system, product, or apparatus that includes a series of steps or units is not limited to the listed steps or units, but optionally further includes steps or units not listed, or optionally further includes other steps or units inherent to the process, method, product, or apparatus.

It is to be noted that, features described in various embodiments of the disclosure may be mutually combined if these features do not conflict with one another.

Figure 1:
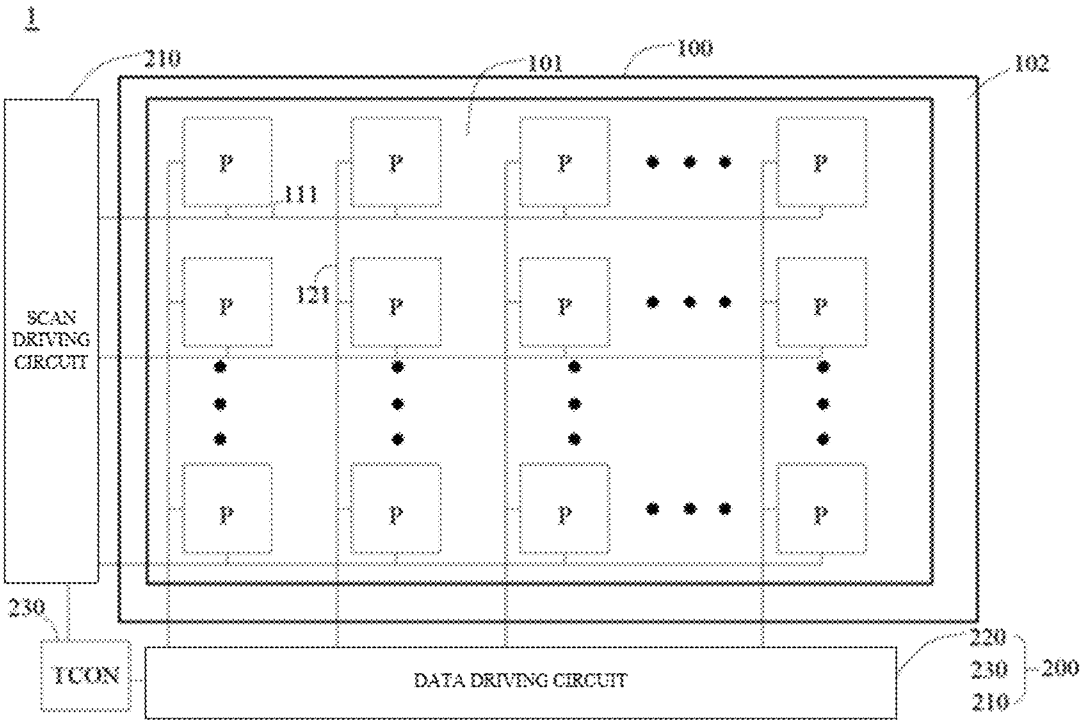
FIG. 1 is a schematic structural view of a display apparatus provided in embodiments of the disclosure.

Reference is made to FIG. 1. embodiments of the disclosure provide a display apparatus 1. The display apparatus 1 includes a display panel 100 and a driving circuit 200. The display panel 100 includes a display region 101 and a non-display region 102. The display panel 100 includes n scan lines 111 extending in a row direction and arranged in a column direction, m data lines 121 extending in a column direction and arranged in a row direction, and multiple sub-pixels P defined by the n scan lines 111 and the m data lines 121 intersecting with one another, where $1<n$, $1<m$, for example, $n=1080$, and $m=3\times1920$.

The driving circuit 200 is configured to drive the display panel 100 to display, where the driving circuit 200 includes a scan driving circuit 210 and a data driving circuit 220. The scan driving circuit 210 is electrically connected to the sub-pixels P in each sub-pixel row through the n scan lines 111, and the scan driving circuit 210 is configured to generate a corresponding scanning signal for each sub-pixel row. The data driving circuit 220 is electrically connected to the sub-pixels P in each sub-pixel column through the m data lines 121. The data driving circuit 220 is configured to generate a corresponding data voltage $V_{data}$ for each sub-pixel column, and output the data voltage $V_{data}$ to each sub-pixel P in the sub-pixel column.

Figure 2:
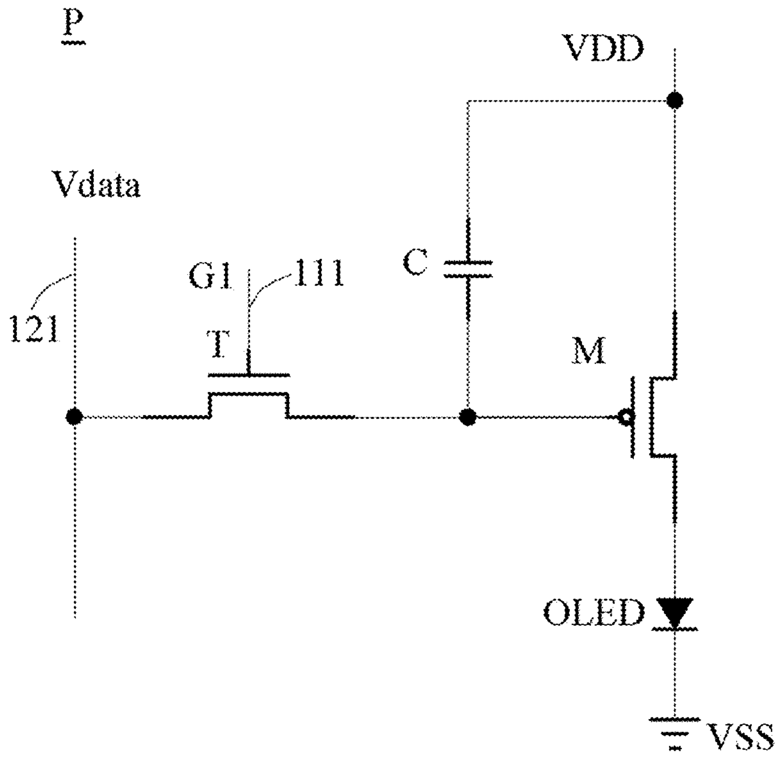
FIG. 2 is a schematic structural view of a circuit of a sub-pixel provided in embodiments of the disclosure.

Reference is made to FIG. 2, and a sub-pixel P of a 2T1C structure provided in embodiments of the disclosure is illustrated in FIG. 2. The sub-pixel P includes a scan transistor T, a drive transistor M, a storage capacitor C, and a light-emitting element OLED.

A cathode of the light-emitting element OLED is configured to receive a reference voltage VSS, and a source of the drive transistor M is configured to receive a power supply voltage VDD. A drain of the drive transistor M is electrically connected to an anode of the light-emitting element OLED, and a gate of the drive transistor M is electrically connected to a drain of the scan transistor T. A source of the scan transistor T is electrically connected to the data line 121 and is configured to receive the data voltage $V_{data}$ through the data line 121. A gate of the scan transistor T is electrically connected to the scan line 111 and is configured to receive the scanning signal through the scan line 111. The the storage capacitor C has a first terminal electrically connected to the source of the drive transistor M, and has a second terminal electrically connected to the gate of the drive transistor M. Exemplarily, when a scan line 111 corresponding to a sub-pixel P scans a sub-pixel row where the sub-pixel P is located, that is, when the scanning signal is received, the scan transistor T is turned on, and the storage capacitor C is charged by the data voltage $V_{data}$ of the data line 121 via the scan transistor T, so that the second terminal of the storage capacitor C is charged to the data voltage $V_{data}$, and thus the drive transistor M drives the light-emitting element OLED to emit light according to the data voltage $V_{data}$ received at the gate of the drive transistor M and the power supply voltage VDD received at the source of the drive transistor M. At this time, a source-gate voltage of the drive transistor M is $V_{sg}=V_s-V_g=VDD-V_{data}$, and a driving current $I_{ds}$ flowing through the light-emitting element OLED and the source-gate voltage $V_{sg}$ of the drive transistor M satisfy the following relationship. $I_{ds}=(K/2)(V_{sg}-|V_{th}|)^2=(K/2)(VDD-V_{data}-|V_{th}|)^2$.

$K=C_{ox}\times\mu W/L$, where $C_{ox}$ is a gate capacitance per unit area, represents a migration rate of channel electron motion, W/L represents a width-length ratio of a channel of the drive transistor M, and $V_t$h represents a threshold voltage of the drive transistor M.

Figure 3:
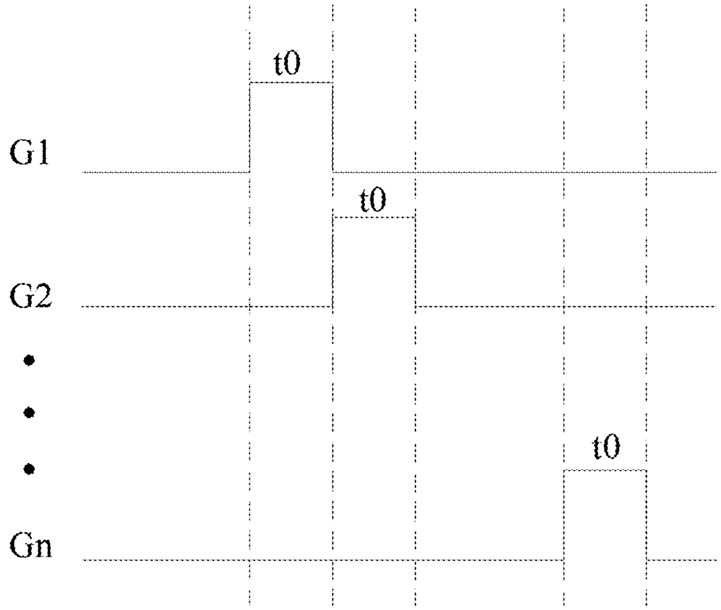
FIG. 3 is a timing sequence diagram of a scanning signal in a driving method for a display panel in the related art.

In the related art, a refresh rate of an OLED display panel is limited to about 360 Hz at the highest. After research, it is found that a main factor limiting the increase of the refresh rate is a charging duration of a storage capacitor C in a sub-pixel P. Specifically, a higher display resolution and a higher refresh rate lead to a limited scanning duration of each scan line 111. As a result, the charging duration of each sub-pixel row is limited. In order to ensure a good display effect, a sufficient charging duration is needed for each sub-pixel P. In an existing display apparatus, the time allocated to each frame of image is the same. The scanning duration of each scan line 111 is also the same for one frame of image. As illustrated in FIG. 3, $G_1$~$G_n$ are scanning signals transmitted by the first scan line 111 to the n-th scan line 111. The scanning duration of each scan line 111 is to. However, for some sub-pixels P with low target grayscales in some display frames, a required charging duration may be less than to, resulting in a waste of scanning duration, and thus the improvement of the refresh rate may be limited.

In view of this, a driving method for a display panel is provided in embodiments of the disclosure. The driving method is applicable to the driving circuit 200, and the display panel 100 includes n scan lines 111 extending in a row direction and n sub-pixel rows in one-to-one correspondence with the n scan lines 111, where $1<n$.

Figure 5:
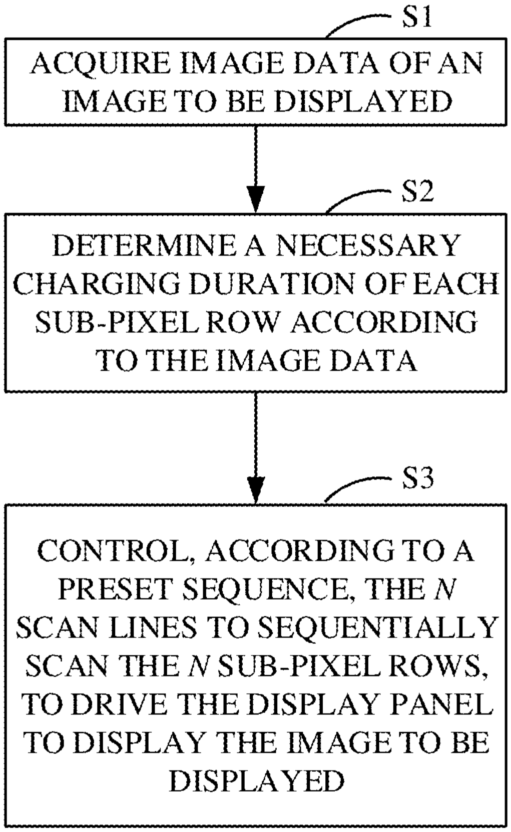
FIG. 5 is a flow chart of the driving method for the display panel provided in embodiments of the disclosure.

As illustrated in FIG. 5, the driving method includes the following operations.

At S1, image data of an image to be displayed is acquired.

At S2, a necessary charging duration of each sub-pixel row according to the image data is determined.

At S3, the n scan lines 111 are controlled according to a preset sequence to sequentially scan the n sub-pixel rows, to drive the display panel 100 to display the image to be displayed, where a scanning duration of each scan line 111 is positively correlated to the necessary charging duration of a sub-pixel row corresponding to the scan line 111. The preset sequence may be from top to bottom in a column direction or from bottom to top in a column direction.

In the driving method for the display panel provided in the disclosure, the necessary charging duration of each sub-pixel row is analyzed in advance according to the image data of the image to be displayed, and then a corresponding scanning duration is assigned to a corresponding scan line 111 according to the necessary charging duration of each sub-pixel row. In this way, the scanning duration of each scan line 111 can be shortened to the minimum, and the refresh rate of the display panel 100 can be dynamically adjusted, thereby enabling the display panel 100 to display each frame at the highest refresh rate possible.

Figure 4:
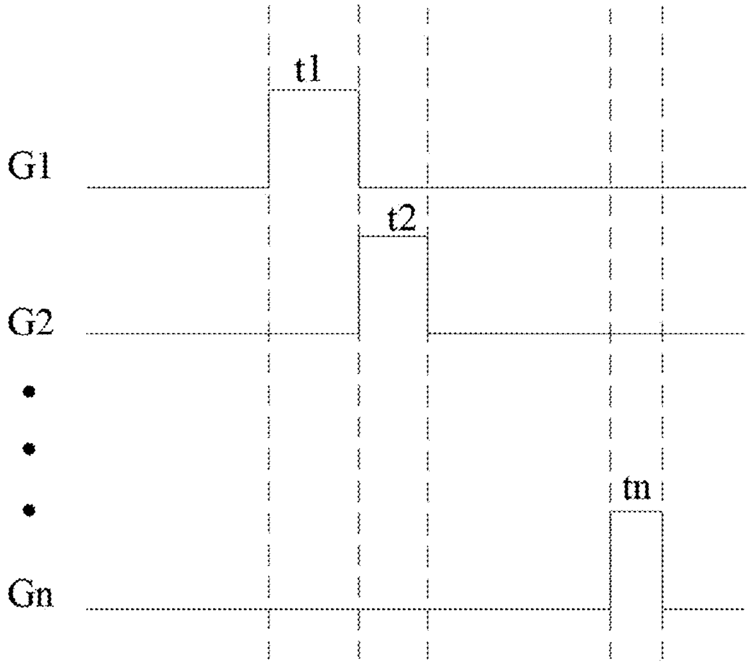
FIG. 4 is a timing sequence diagram of a scanning signal in a driving method for a display panel provided in embodiments of the disclosure.

Exemplarily, as illustrated in FIG. 3, in an existing driving method for a display panel, the scanning duration of each scan line 111 is $t_0$, and a display duration of one frame of display image is $n\times t_0$. That is, a refresh rate $f_0$ is $1/(n\times t_0)$. As illustrated in FIG. 4, in the driving method for the display panel provided in embodiments of the disclosure, the scanning duration of the i-th scan line 111 is $t_i$, where $1\leq i\leq n$. A display duration of one frame of display image is $t_1+t_2+\ldots+t_n$. That is, a refresh rate $f_1$ is $1/(t_1+t_2+\ldots+t_n)$. Since $t_1$ is determined according to the necessary charging duration of the i-th sub-pixel row and $t_i<t_0$, $f_1\geq f_0$.

The scanning duration of each scan line 111 is k times of the necessary charging duration of a sub-pixel row corresponding to the scan line 111, where k>1. It is to be understood that, when k=1, the refresh rate of the display panel 100 can be improved to the greatest extent. Larger k indicates a poorer improvement of the refresh rate of the display panel 100 and a higher chance for each sub-pixel row to be fully charged. Exemplarily, k=1.01. In this way, a time margin of 1% is reserved, and thus an insufficient charging duration of some sub-pixel rows caused by reasons such as non-uniform manufacturing process of each sub-pixel row may be avoided.

Figure 6:
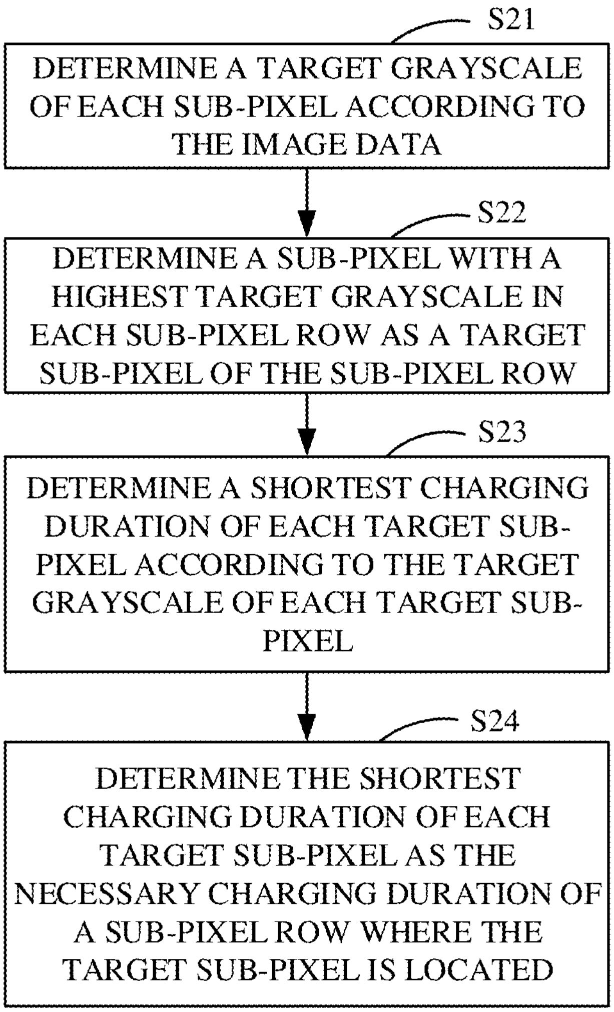
FIG. 6 is a detailed flow chart of an operation at S2 in FIG. 5.

Reference is made to FIG. 6, which is a detailed flow chart of an operation at S2. The operation at S2 specifically includes the following operations at S21~S24.

At S21, a target grayscale of each sub-pixel P is determined according to the image data.

At S22, a sub-pixel P with a highest target grayscale in each sub-pixel row is determined as a target sub-pixel of the sub-pixel row.

At S23, a shortest charging duration of each target sub-pixel is determined according to the target grayscale of each target sub-pixel.

At S24, the shortest charging duration of each target sub-pixel is determined as the necessary charging duration of a sub-pixel row where the target sub-pixel is located.

It is to be noted that, according to the characteristics of capacitor, the charge Q of the storage capacitor C, the charging voltage AU, the capacitance C, the charging current I, and the charging duration Δt, satisfy the following relationship. $Q=C\times\Delta U=C\times|V_{data}-VDD|=I\times\Delta t$.

In the same sub-pixel row, the storage capacitor C of the sub-pixel P with the highest target grayscale has the largest amount of charges to be stored, so that the storage capacitor C of the sub-pixel P has the largest charging voltage AU. That is, under the same charging current I, the sub-pixel P with the highest target grayscale has the largest charging duration Δt. Therefore, the sub-pixel P having the highest target grayscale in each sub-pixel row is determined as the target sub-pixel, and the minimum charging duration of each target sub-pixel is determined as the necessary charging duration of a sub-pixel row where the target sub-pixel is located. On one hand, the necessary charging duration of each sub-pixel row can be ensured be shortened to the minimum. On the other hand, all the sub-pixels P in each sub-pixel row can be ensured to be sufficiently charged.

Further, in embodiments of the disclosure, a preset correspondence is stored in the driving circuit 200, and the preset correspondence includes a one-to-one correspondence between multiple grayscales and multiple data voltages. Exemplarily, the preset correspondence includes a one-to-one correspondence between 0-255 grayscales and 256 data voltages.

Figure 7:
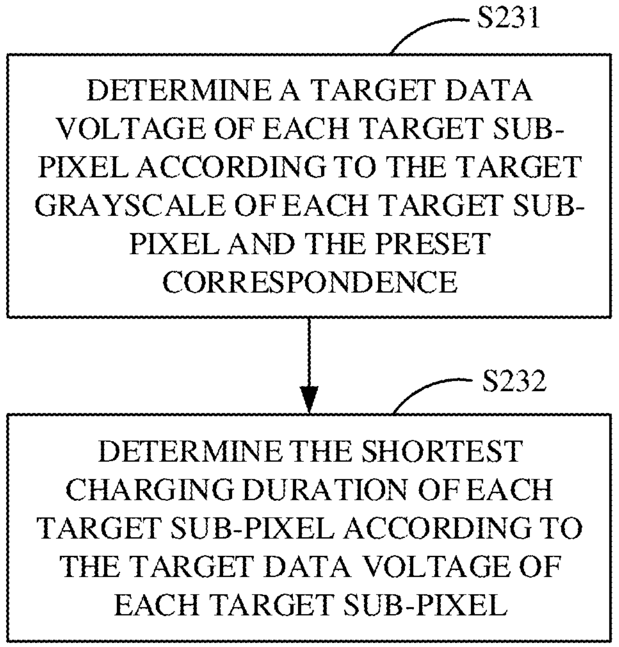
FIG. 7 is a detailed flow chart of an operation at S23 in FIG. 6.

Reference is made to FIG. 7, which is a detailed flow chart of an operation at S23. The operation at S23 specifically includes the following operations at S231~S232.

At S231, a target data voltage of each target sub-pixel is determined according to the target grayscale of each target sub-pixel and the preset correspondence.

At S232, the shortest charging duration of each target sub-pixel is determined according to the target data voltage of each target sub-pixel.

In other embodiments, the preset correspondence may further include a one-to-one correspondence between multiple grayscales and multiple charging durations. In this way, according to the target gray scale of each target sub-pixel and the preset correspondence, the shortest charging duration of each target sub-pixel can be directly determined through table look-up.

Exemplarily, in some embodiments, each sub-pixel P is of a 2T1C structure as illustrated in FIG. 2. That is, the sub-pixel P includes a scan transistor T, a drive transistor M, a storage capacitor C and a light-emitting element OLED. A first terminal of the storage capacitor C is configured to receive the power supply voltage VDD, and a second terminal of the storage capacitor C is configured to receive a target data voltage of a sub-pixel P when the scan line 111 scans the sub-pixel P. In other embodiments, each sub-pixel P may be of other circuit structures, such as 4T1C, 5T1C, 6T1C, 7T2C, etc., which is not limited herein.

Figure 8:
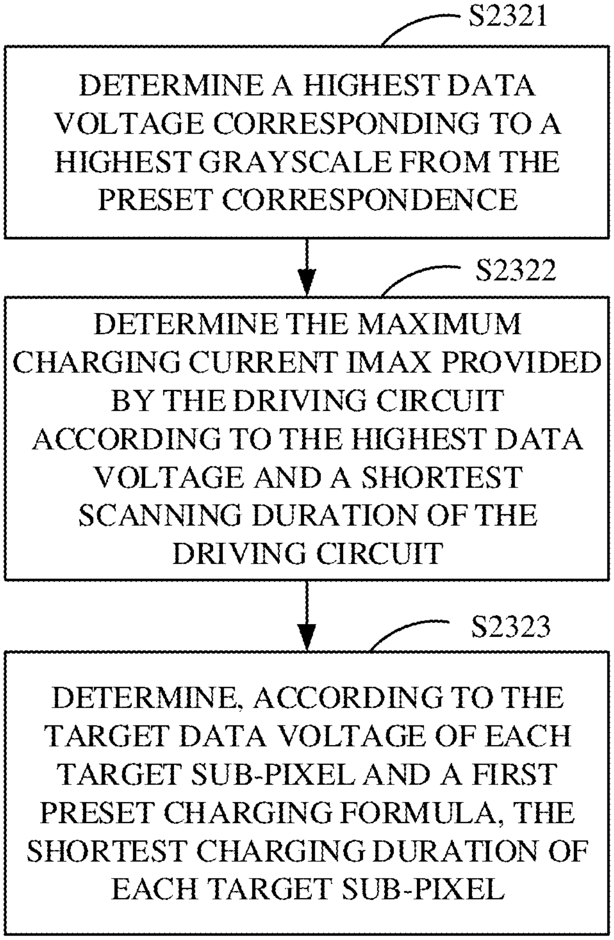
FIG. 8 is a detailed flow chart of an operation at S232 in FIG. 7.

Further, reference is made to FIG. 8, in an embodiment, an operation at S232 includes the following operations at S2321~S2323.

At S2321, a highest data voltage corresponding to a highest grayscale is determined from the preset correspondence.

Exemplarily, in the preset correspondence, the highest grayscale is 255 grayscale, and the data voltage corresponding to the 255 grayscale is the highest data voltage $V_{dmax}$.

At S2322, a maximum charging current $I_{max}$ provided by the driving circuit 200 is determined according to the highest data voltage and a shortest scanning duration of the driving circuit 200.

The shortest scanning duration is a scanning duration of one scan line 111 when the driving circuit 200 is at a maximum refresh rate.

At S2323, the shortest charging duration of each target sub-pixel is determined according to the target data voltage of each target sub-pixel and a first preset charging formula.

The first preset charging formula is: $t_i=|V_{di}-VDD|\times C/I_{max}$, wherein $t_i$ is a shortest charging duration of a target sub-pixel in an i-th sub-pixel row, Vai is a target data voltage of the target sub-pixel in the i-th sub-pixel row, C is a capacitance of the storage capacitor, $I_{max}$ is the maximum charging current provided by the driving circuit 200, and $1\leq i\leq n$.

In another implementation manner, the operation at S232 may only include an operation at S2323. In this case, the maximum charging current $I_{max}$ may be obtained by testing the display apparatus 1 and stored in the driving circuit 200 before factory delivery.

Further, in embodiments of the disclosure, the operation at S2322 includes operation at S23221.

At S23221, the maximum charging current $I_{max}$ provided by the driving circuit 200 is determined according to the highest data voltage, the shortest scanning duration of the driving circuit 200, and a second preset charging formula.

The second preset charging formula is: $I_{max}=|V_{dmax}-VDD|\times C/t_{min}$, where $V_{dmax}$ is the highest data voltage, and $t_{min}$ is the shortest scanning duration.

$t_{min}$ is a scanning duration of each scan line 111 corresponding to a maximum standard refresh rate (for example, 360 Hz) supported by the driving circuit 200, and $t_{min}$ is a known parameter.

It is to be noted that, since the storage capacitor C is an energy storage element, the charging current provided by the driving circuit 200 to the storage capacitor C is not determined by the capacitance of the storage capacitor C, instead, it is determined by the driving capability of the driving circuit 200. That is, it may be considered that the charging current output to each sub-pixel P can reach the maximum charging current $I_{max}$ when the driving circuit 200 provides different target data voltages. Therefore, the shortest charging duration of each sub-pixel P can be obtained according to the maximum charging current $I_{max}$.

In some embodiments, before the operation at S2323, the driving method further includes the following. A simulation model of the display panel 100 is established, and the capacitance C of the storage capacitor is obtained by performing simulation analysis on the simulation model.

Since the sub-pixels P are the same in terms of the circuit structure, the sub-pixels P are almost the same in terms of the capacitance C. In other embodiments, the capacitance C of the storage capacitor may be determined through other manners, for example, the capacitance C may be obtained by performing a charging test on the display panel 100.

Figure 9:
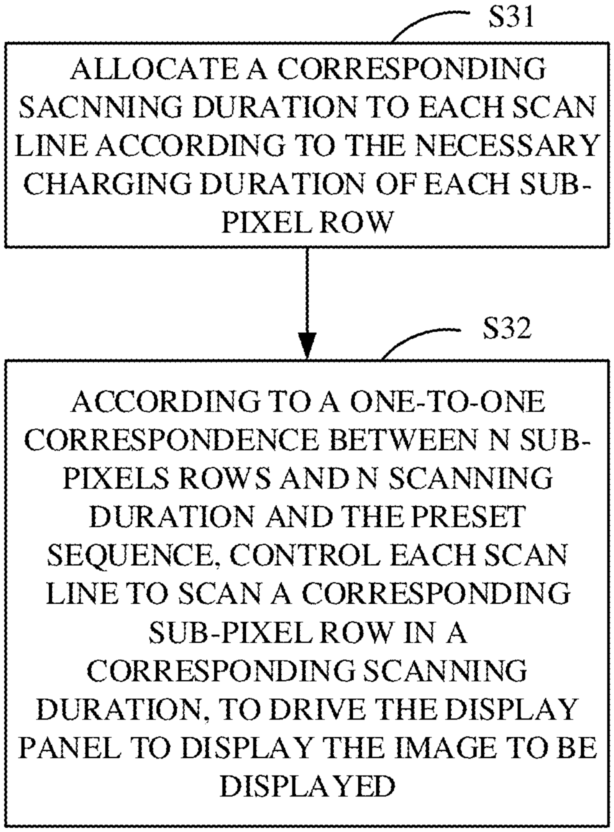
FIG. 9 is a detailed flow chart of operation at S3 in FIG. 5.

Further, reference is made to FIG. 9, in an embodiment, an operation at S3 includes the following operations at S31~S32.

At S31, a corresponding scanning duration is allocated to each scan line 111 according to the necessary charging duration of each sub-pixel row.

The scanning duration of each scan line 111 is positively correlated to the necessary charging duration of a sub-pixel row corresponding to the scan line 111.

At S32, according to a one-to-one correspondence between n sub-pixel rows and n scanning durations and the preset sequence, each scan line 111 is controlled to scan a corresponding sub-pixel row for a corresponding scanning duration, to drive the display panel 100 to display the image to be displayed.

Reference is again made to FIG. 1, based on the same inventive concept, embodiments of the disclosure further provide the driving circuit 200. The driving circuit 200 is configured to execute operations in the driving method for the display panel of any of the above embodiments, to drive the display panel 100 to display.

In some embodiments, the driving circuit 200 includes the scan driving circuit 210, the data driving circuit 220, and a timing controller (TCON) 230.

The TCON 230 is configured to acquire image data of an image to be displayed, determine a necessary charging duration of each sub-pixel row according to the image data, allocate a corresponding scanning duration to each scan line 111 according to the necessary charging duration of each sub-pixel row, and control the scan driving circuit 210 to control the n scan lines 111 according to a preset sequence to sequentially scan the n sub-pixel rows, to drive the display panel 100 to display the image to be displayed.

The scanning duration of each scan line 111 is positively correlated to the necessary charging duration of a sub-pixel row corresponding to the scan line 111.

In some embodiments, the TCON 230 is further configured to determine a target grayscale of each sub-pixel according to the image data, determine a sub-pixel with a highest target grayscale in each sub-pixel row as a target sub-pixel of the sub-pixel row, determine the shortest charging duration of each target sub-pixel according to the target grayscale of each target sub-pixel, and determine the shortest charging duration of each target sub-pixel as the necessary charging duration of a sub-pixel row where the target sub-pixel is located.

In some embodiments, a preset correspondence is stored in the driving circuit 200, and the preset correspondence includes a one-to-one correspondence between multiple grayscales and multiple data voltages. The TCON 230 is further configured to determine a target data voltage of each target sub-pixel according to the target grayscale of each target sub-pixel and the preset correspondence, and determine the shortest charging duration of each target sub-pixel according to the target data voltage of each target sub-pixel.

In some embodiments, the TCON 230 is further configured to determine the shortest charging duration of each target sub-pixel according to the target data voltage of each target sub-pixel and a first preset charging formula. The first preset charging formula is: $t_i=|V_{di}-VDD|\times C/I_{max}$, where $t_i$ is a shortest charging duration of a target sub-pixel in an i-th sub-pixel row, $V_{di}$ is a target data voltage of the target sub-pixel in the i-th sub-pixel row, C is a capacitance of the storage capacitor, and $I_{max}$ is a maximum charging current provided by the driving circuit 200.

In some embodiments, the TCON 230 is further configured to determine a highest data voltage corresponding to a highest grayscale from the preset correspondence, and determine the maximum charging current $I_{max}$ provided by the driving circuit 200 according to the highest data voltage and a shortest scanning duration of the driving circuit 200, where the shortest scanning duration is a scanning duration of one scan line 111 when the driving circuit 200 is at the maximum refresh rate.

In some embodiments, the TCON 230 is further configured to determine the maximum charging current $I_{max}$ provided by the driving circuit 200 according to the highest data voltage, the shortest scanning duration of the driving circuit 200, and a second preset charging formula. The second preset charging formula is: $I_{max}=|V_{dmax}-VDD|\times C/t_{min}$, where $V_{dmax}$ is the highest data voltage, and $t_{min}$ is the shortest scanning duration.

Reference is again made to FIG. 1, based on the same inventive concept, embodiments of the disclosure further provide a display apparatus 1. The display apparatus 1 includes the driving circuit 200 of any of the above embodiments and the display panel 100. The driving circuit 200 is electrically connected to the display panel 100 and is configured to drive the display panel 100 to display.

The driving circuit 200 and the display apparatus 1 correspond to the driving method for the display panel described above. A more detailed description can be found in the various embodiments of the driving method for the display panel described above.

Based on the same inventive concept, the disclosure also provides a non-transitory computer-readable storage medium. The non-transitory computer-readable storage medium stores a computer program, and the computer program is executed after being invoked by a processor, so as to realize the operations in the driving method for the display panel as described in any of the above embodiments.

The non-transitory computer-readable storage medium may be any combination of one or more computer-readable medium(s). The computer-readable medium may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination thereof. More specific examples (a non-exhaustive list) of the computer-readable storage medium include: an electrical connection having one or more wires, a portable computer diskette, a hard disk, a random access memory (RAM), a read-only memory (ROM), an erasable programmable read-only memory (EPROM) or flash memory, an optical fiber, a portable compact disc read-only memory (CD-ROM), an optical storage device, a magnetic storage device, or any suitable combination thereof. In the context of this document, a computer-readable storage medium may be any tangible medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, radio frequency (RF), or any suitable combination thereof.

Computer program code for carrying out operations under this application may be written in any combination of one or more programming languages, including an object oriented programming language such as lava, Smalltalk, C++ or the like and conventional procedural programming languages, such as the "C" programming language or similar programming languages. The program code may be executed entirely on the user's computer, partly on the user's computer, as a stand-alone software package, partly on the user's computer and partly on a remote computer, or entirely on a remote computer or server. In a scenario involving a remote computer, the remote computer may be connected to the user's computer through any type of network, including a local area network (LAN) or a wide area network (WAN), or may be connected to an external computer (for example, through the Internet using an Internet Service Provider).

For a person skilled in the art, apparently, the present application is not limited to the details in the foregoing exemplary embodiments, and the present application can be implemented in other specific forms without departing from the spirit or basic features of the present application. Therefore, from all perspectives, the embodiments should be considered to be exemplary and non-limitative. The scope of the present application is defined by the appended claims instead of the foregoing description. Therefore, all changes that fall within the meanings and scope of equivalent elements of the claims are intended to be covered by the present application. Any reference numeral in the claims should not be construed as limiting the related claims. In addition, apparently, the word "comprise" does not exclude other units or steps, and the singular reference of an element does not exclude the plural reference of such elements.

Although the present application is described in detail with reference to the foregoing embodiments, persons of ordinary skill in the art should understand that they may still make modifications or equivalent replacements to the technical solutions of the present application without departing from the spirit and scope of the technical solutions of the embodiments of the present application.

What is claimed is:

1. A driving method for a display panel, wherein the driving method is applicable to a driving circuit, the driving circuit is configured to drive the display panel to display, and the display panel comprises n scan lines extending in a row direction and n sub-pixel rows in one-to-one correspondence with the n scan lines, wherein n is an integer greater than 1, the driving method comprising:

acquiring image data of an image to be displayed;

determining a necessary charging duration of each sub-pixel row according to the image data; and controlling, according to a preset sequence, the n scan lines to sequentially scan the n sub-pixel rows, to drive the display panel to display the image to be displayed, wherein a scanning duration of each scan line is positively correlated to the necessary charging duration of a sub-pixel row corresponding to the scan line, wherein the determining the necessary charging duration of each sub-pixel row according to the image data, comprises:

determining a target grayscale of each sub-pixel according to the image data:

determining a sub-pixel with a highest target grayscale in each sub-pixel row as a target sub-pixel of the sub-pixel row:

determining a shortest charging duration of each target sub-pixel according to the target grayscale of each target sub-pixel; and determining the shortest charging duration of each target sub-pixel as the necessary charging duration of a sub-pixel row where the target sub-pixel is located.

2. The driving method for the display panel of claim 1, wherein a preset correspondence is stored in the driving circuit, and the preset correspondence comprises a one-to-one correspondence between a plurality of grayscales and a plurality of data voltages; and wherein the determining the shortest charging duration of each target sub-pixel according to the target grayscale of each target sub-pixel comprises:

determining a target data voltage of each target sub-pixel according to the target grayscale of each target sub-pixel and the preset correspondence; and determining the shortest charging duration of each target sub-pixel according to the target data voltage of each target sub-pixel.

3. The driving method for the display panel of claim 2, wherein each sub-pixel comprises a storage capacitor, the storage capacitor has a first terminal configured to receive a power supply voltage, and the storage capacitor has a second terminal configured to receive a target data voltage of a sub-pixel when a scan line scans the sub-pixel; and wherein the determining the shortest charging duration of each target sub-pixel according to the target data voltage of each target sub-pixel comprises:

determining, according to the target data voltage of each target sub-pixel and a first preset charging formula, the shortest charging duration of each target sub-pixel, wherein the first preset charging formula is: $t_i=|V_{di}-VDD|\times C/I_{max}$ wherein $t_i$ represents a shortest charging duration of a target sub-pixel in an i-th sub-pixel row, VDD represents the power supply voltage, $V_{di}$ represents a target data voltage of the target sub-pixel in the i-th sub-pixel row, C represents a capacitance of the storage capacitor, $I_{max}$ represents a maximum charging current provided by the driving circuit, and $1\le i\le n$.

4. The driving method for the display panel of claim 3, wherein before the determining, according to the target data voltage of each target sub-pixel and the first preset charging formula, the shortest charging duration of each target sub-pixel, the driving method further comprises:

determining a highest data voltage corresponding to a highest grayscale from the preset correspondence; and determining the maximum charging current provided by the driving circuit and according to the highest data voltage and a shortest scanning duration of the driving circuit, and wherein the shortest scanning duration is a scanning duration of one scan line when the driving circuit is at a maximum refresh rate.

5. The driving method for the display panel of claim 4, wherein the determining the maximum charging current provided by the driving circuit according to the highest data voltage and the shortest scanning duration of the driving circuit comprises:

determining, according to the highest data voltage, the shortest scanning duration of the driving circuit, and a second preset charging formula, the maximum charging current provided by the driving circuit, wherein the second preset charging formula is: $I_{max}=|V_{dmax}-VDD|\times C/t_{min}$, wherein $V_{dmax}$ represents the highest data voltage, and $t_{min}$ represents the shortest scanning duration.

6. The driving method for the display panel of claim 3, wherein before the determining, according to the target data voltage of each target sub-pixel and the first preset charging formula, the shortest charging duration of each target sub-pixel, the driving method further comprises:

establishing a simulation model of the display panel, and obtaining the capacitance of the storage capacitor by performing simulation analysis on the simulation model.

7. The driving method for the display panel of claim 1, wherein the scanning duration of each scan line is k times of the necessary charging duration of a sub-pixel row corresponding to the scan line, wherein k is an integer greater than or equal to 1.

8. A driving circuit, wherein the driving circuit is configured to drive a display panel to display, and the display panel comprises n scan lines extending in a row direction and n sub-pixel rows in one-to-one correspondence with the n scan lines, wherein n is an integer greater than 1 the driving circuit comprising: a timing controller; and a scan driving circuit, wherein the timing controller is configured to:

acquire image data of an image to be displayed;

determine a necessary charging duration of each sub-pixel row according to the image data; and control, the scan driving circuit to control the n scan lines according to a preset sequence to sequentially scan the n sub-pixel rows, to drive the display panel to display the image to be displayed, wherein a scanning duration of each scan line is positively correlated to the necessary charging duration of a sub-pixel row corresponding to the scan line, and wherein the timing controller configured to determine the necessary charging duration of each sub-pixel row according to the image data is configured to:

determine a target grayscale of each sub-pixel according to the image data:

determine a sub-pixel with a highest target grayscale in each sub-pixel row as a target sub-pixel of the sub-pixel row:

determine a shortest charging duration of each target sub-pixel according to the target grayscale of each target sub-pixel; and determine the shortest charging duration of each target sub-pixel as the necessary charging duration of a sub-pixel row where the target sub-pixel is located.

9. The driving circuit of claim 8, wherein a preset correspondence is stored in the driving circuit, and the preset correspondence comprises a one-to-one correspondence between a plurality of grayscales and a plurality of data voltages; and wherein the timing controller configured to determine the shortest charging duration of each target sub-pixel according to the target grayscale of each target sub-pixel is configured to:

determine a target data voltage of each target sub-pixel according to the target grayscale of each target sub-pixel and the preset correspondence; and determine the shortest charging duration of each target sub-pixel according to the target data voltage of each target sub-pixel.

10. The driving circuit of claim 9, wherein each sub-pixel comprises a storage capacitor, the storage capacitor has a first terminal configured to receive a power supply voltage, and the storage capacitor has a second terminal configured to receive a target data voltage of a sub-pixel when a scan line scans the sub-pixel; and wherein the timing controller configured to determine the shortest charging duration of each target sub-pixel according to the target data voltage of each target sub-pixel is configured to:

determine, according to the target data voltage of each target sub-pixel and a first preset charging formula, the shortest charging duration of each target sub-pixel, wherein the first preset charging formula is: $t_i=|V_{di}-VDD|\times C/I_{max}$, wherein $t_i$ represents a shortest charging duration of a target sub-pixel in an i-th sub-pixel row, VDD represents the power supply voltage, $V_{di}$ represents a target data voltage of the target sub-pixel in the i-th sub-pixel row, C represents a capacitance of the storage capacitor, $I_{max}$ represents a maximum charging current provided by the driving circuit, and $1\leq i\leq n$.

11. The driving circuit of claim 10, wherein before the timing controller configured to determine, according to the target data voltage of each target sub-pixel and the first preset charging formula, the shortest charging duration of each target sub-pixel, the driving circuit is configured to:

determine a highest data voltage corresponding to a highest grayscale from the preset correspondence; and determine the maximum charging current provided by the driving circuit according to the highest data voltage and a shortest scanning duration of the driving circuit, wherein the shortest scanning duration is a scanning duration of one scan line when the driving circuit is at a maximum refresh rate.

12. The driving circuit of claim 11, wherein in the timing controller configured to determine the maximum charging current provided by the driving circuit according to the highest data voltage and the shortest scanning duration of the driving circuit is configured to:

determine, according to the highest data voltage, the shortest scanning duration of the driving circuit, and a second preset charging formula, the maximum charging current provided by the driving circuit, wherein the second preset charging formula is: $I_{max}=|V_{dmax}-VDD|\times C/t_{min}$, wherein $V_{dmax}$ represents the highest data voltage, and $t_{min}$ represents the shortest scanning duration.

13. The driving circuit of claim 10, wherein before the timing controller configured to determine, according to the target data voltage of each target sub-pixel and the first preset charging formula, the shortest charging duration of each target sub-pixel, the timing controller is configured to:

establish a simulation model of the display panel, and obtain the capacitance of the storage capacitor by performing simulation analysis on the simulation model.

14. The driving circuit of claim 8, wherein the scanning duration of each scan line is k times of the necessary charging duration of a sub-pixel row corresponding to the scan line, wherein k is an integer greater than or equal to 1.

15. A display apparatus, comprising:

a display panel; and a driving circuit, wherein the driving circuit is electrically connected to the display panel and the driving circuit is configured to drive a display panel to display, and the display panel comprises n scan lines extending in a row direction and n sub-pixel rows in one-to-one correspondence with the n scan lines, wherein n is an integer greater than 1, and the driving circuit is configured to:

acquire image data of an image to be displayed;

determine a necessary charging duration of each sub-pixel row according to the image data; and control, according to a preset sequence, the n scan lines to sequentially scan the n sub-pixel rows, to drive the display panel to display the image to be displayed, wherein a scanning duration of each scan line is positively correlated to the necessary charging duration of a sub-pixel row corresponding to the scan line, wherein the driving circuit configured to determine the necessary charging duration of each sub-pixel row according to the image data is configured to:

determine a target grayscale of each sub-pixel according to the image data;

determine a sub-pixel with a highest target grayscale in each sub-pixel row as a target sub-pixel of the sub-pixel row;

determine a shortest charging duration of each target sub-pixel according to the target grayscale of each target sub-pixel; and determine the shortest charging duration of each target sub-pixel as the necessary charging duration of a sub-pixel row where the target sub-pixel is located.

16. The display apparatus of claim 15, wherein a preset correspondence is stored in the driving circuit, and the preset correspondence comprises a one-to-one correspondence between a plurality of grayscales and a plurality of data voltages, and wherein the driving circuit configured to determine the shortest charging duration of each target sub-pixel according to the target grayscale of each target sub-pixel is configured to:

determine a target data voltage of each target sub-pixel according to the target grayscale of each target sub-pixel and the preset correspondence; and determine the shortest charging duration of each target sub-pixel according to the target data voltage of each target sub-pixel.

17. The display apparatus of claim 16, wherein each sub-pixel comprises a storage capacitor, the storage capacitor has a first terminal configured to receive a power supply voltage, and the storage capacitor has a second terminal configured to receive a target data voltage of a sub-pixel when a scan line scans the sub-pixel, and wherein the driving circuit configured to determine the shortest charging duration of each target sub-pixel according to the target data voltage of each target sub-pixel is configured to:

determine, according to the target data voltage of each target sub-pixel and a first preset charging formula, the shortest charging duration of each target sub-pixel, wherein the first preset charging formula is: $t_i=V_{di}-VDD|\times C/I_{max}$, wherein $t_i$ represents a shortest charging duration of a target sub-pixel in an i-th sub-pixel row, VDD represents the power supply voltage, $V_{di}$ represents a target data voltage of the target sub-pixel in the i-th sub-pixel row, C represents a capacitance of the storage capacitor, $I_{max}$ represents a maximum charging current provided by the driving circuit, and $1 \le i \le n$.

* * * * *